United States Patent [19]

Hishinuma et al.

[11] 4,081,509

[45] Mar. 28, 1978

[54] METHOD FOR REMOVING NITROGEN OXIDES FROM FLUE GAS BY ABSORPTION

[75] Inventors: Yukio Hishinuma, Hitachi; Hidetoshi Akimoto, Ibaraki; Ryuichi Kaji; Fumito Nakajima, both of Hitachi; Yoshijiro Arikawa, Hitachi, all of Japan

[73] Assignees: Hitachi, Ltd.; Babcock-Hitachi Kabushiki Kaisha, both of Japan

[21] Appl. No.: 668,432

[22] Filed: Mar. 19, 1976

[30] Foreign Application Priority Data

Mar. 31, 1975 Japan ............................ 50-38868

[51] Int. Cl.$^2$ ............................................. C01B 21/00
[52] U.S. Cl. .................................. 423/235; 423/387; 55/68
[58] Field of Search ............... 423/235, 239, 351, 387; 55/68; 260/299

[56] References Cited

U.S. PATENT DOCUMENTS

| | | | |
|---|---|---|---|
| 1,888,547 | 11/1932 | Bent | 423/235 |
| 3,635,657 | 1/1972 | Bressan et al. | 423/235 |
| 3,801,696 | 4/1974 | Mark | 423/235 |
| 3,809,744 | 5/1974 | von Semel | 423/235 |
| 3,984,522 | 10/1976 | Salton et al. | 423/235 |
| 3,991,161 | 11/1976 | Salton et al. | 423/235 |
| 3,992,508 | 11/1976 | Salton et al. | 423/235 |

FOREIGN PATENT DOCUMENTS

| | | | |
|---|---|---|---|
| 2,353,528 | 5/1974 | Germany | 423/235 |
| 2,456,197 | 5/1975 | Germany | 423/235 |
| 1,251,900 | 10/1967 | Germany | 423/235 |
| 520,793 | 3/1931 | Germany | 423/235 |
| 521,031 | 3/1931 | Germany | 423/235 |
| 267,603 | 6/1970 | U.S.S.R. | 423/235 |

OTHER PUBLICATIONS

Inorganic Synthesis–Nyhelm et al.–195)–pp. 117–122.
Chem. Rev.–1963–Vogt, et al.–pp. 269–277.
Jour. of Chem. Soc.–1965–Earashaw, et al.–pp. 4708–4723.
Chemistry of the Metal Chelate Compounds–Martell, et al.–1952–pp. 336–358.

*Primary Examiner*—Earl C. Thomas
*Assistant Examiner*—Eugene T. Wheelock
*Attorney, Agent, or Firm*—Craig & Antonelli

[57] ABSTRACT

Nitrogen oxides are removed from a flue gas by wet process, where the flue gas is contacted with a solution of transition metal complex compounds capable of reacting with oxygen in the presence of oxygen, thereby forming oxygen complexes, and the nitrogen oxides are oxidized and absorbed by the oxygen complexes.

17 Claims, 2 Drawing Figures

METHOD FOR REMOVING NITROGEN OXIDES FROM FLUE GAS BY ABSORPTION

This invention relates to a method for removing nitrogen oxides from a gaseous mixture containing oxygen such as combustion flue gas, process gas, etc. by wet process through absorption, and more particularly to a method for oxidizing and absorbing the nitrogen oxides from the gaseous mixture by oxygen complexes formed by reaction of transition metal complex compounds with oxygen.

Nitrogen oxides, mainly nitrogen monoxide, exist in a combustion flue gas resulting from combustion of fossil fuel as in boilers for power stations, etc. or a flue gas from many metal refineries and chemical plants, such as sintering furnaces, metal surface-treating furnaces, heating furnaces and nitric acid plants. Furthermore, a large amount of nitrogen oxides exists in an effluent gas from internal combustion engines. Nitrogen oxides will be referred to herein also as "$NO_x$".

Atmospheric pollution due to discharge of these nitrogen oxides to the atmosphere is a cause for photochemical smogs and complex pollution with other toxic substances such as sulfur oxides, hydrocarbons and oxidants, and now a development of a method for preventing the atmospheric pollution is a very urgent task. In a combustion flue gas, most of the nitrogen oxides contained in the flue gas is not oxidized to nitrogen dioxide, and thus exists in a form of nitrogen monoxide. Problems in making the nitrogen oxides in the flue gas harmless are that a very large amount of flue gas must be treated, and the nitrogen oxides, especially nitrogen monoxide taking the most portion of the nitrogen oxides, have a very low reactivity. Thus, an apparatus of larger size must be employed for that purpose.

Various types of dry and wet processes have been so far proposed for effectively removing the nitrogen oxides. A catalytic reduction method using ammonia is typical of the dry process, but it is necessary to carry out the reaction at a high temperature such as about 300° C. The wet processes using absorption with water, alkali, etc. and reductive absorption with sulfites are available. Especially remarkable is an oxidative absorption method, but it is necessary to use special oxidizing agents such as ozone, potassium permanganate, perchlorate, hydrogen peroxide, etc.

An object of the present invention is to provide a method capable of removing nitrogen oxides even at a low temperature.

Another object of the present invention is to provide the method with a stable performance.

Other object of the present invention is to provide the method capable of carrying out the reaction under optimum conditions.

The present invention provides a novel method for removing nitrogen oxides by reacting transition metal complex compounds with oxygen, thereby forming oxygen complexes, oxidizing less active nitrogen monoxide with the activated oxygen in the oxygen complexes, and removing the resulting nitrogen oxide by absorption, and especially provides the method wherein oxygen reacts with transition metal complex compounds of monovalent copper, divalent cobalt, iron, manganese, chromium, etc. and is activated thereby to readily oxidize nitrogen monoxide, which is incapable of being oxidized at a sufficient rate with molecular oxygen, and to absorb the nitrogen oxide. As an oxygen source for forming oxygen, complexes, air can be passed through the solution in advance or the oxygen existing in flue gas can be also utilized. An amount of oxygen is 0.1 to 20% by volume on the basis of total volume of the flue gas.

According to the present invention, the oxygen activated in the oxygen complexes is used as an oxidizing agent, as described above, and thus it is necessary to properly select a transition metal and a ligand capable of readily forming oxygen complexes as constituents for the transition metal complex compounds. As the transition metal ions serving such action are available monovalent copper, divalent cobalt, iron, manganese, chromium, etc., and as the ligand are available ammonia, amines, imidazole derivatives, etc. A solution of transition metal complex compounds resulting from a combination of these transition metals and ligands can readily react with oxygen to form oxygen complexes.

Many studies have been made on the reaction of transition metal complex compounds with oxygen: for example, C.C. Mcdonald et al: J. Am. Chem. Soc. 85 3736 (1963) and L.H. Vogt et al: Chem. Rev. 63 269 (1963). However, most of the studies relate to the reaction mechanism with oxygen and structures of complexes, and there has been no example of applying the oxygen complexes formed to oxidation, absorption and removal of nitrogen monoxide.

Reaction of an ammine complex with oxygen is, for example, given by the following formula:

By contact of these oxygen complexes with nitrogen monoxide, the nitrogen monoxide is oxidized with the activated oxygen in the complexes and absorbed and removed as nitrous acid according to the following formula:

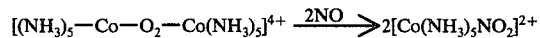

Since the oxygen existing in the flue gas and, as such, being incapable of oxidizing nitrogen monoxide can be utilized as an oxidizing agent by making the oxygen into oxygen complexes, nitrogen monoxide can be very effectively oxidized, and removed by absorption.

To maintain a stable performance in the present invention, it is necessary to prevent centered metallic ions from irreversible oxidation by combining oxygen. Thus, it is necessary to properly select transition metal ions, ligands and composition of absorbing solution. Metallic ions having best performances are divalent cobalt ions, and ligands having the best performances are ammonia, histidine, and ethanolamine.

Now, the present invention will be described in detail, referring to the accompanying drawings.

Figure 1:
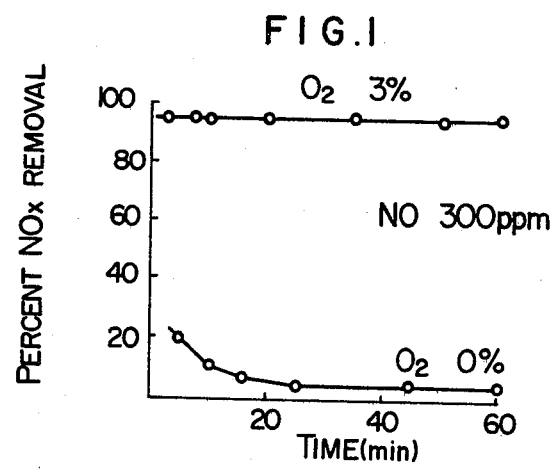
FIG. 1 is a graph showing a percent $NO_x$ removal by a solution of cobalt ammine complex compounds.

In FIG. 1, results of $NO_x$-removing tests using a solution of divalent cobalt complex compounds are shown. The tests were carried out in the following manner. An artificial flue gas containing 300 ppm of nitrogen monoxide and 3 % of oxygen, the balance being nitrogen was passed through 100 ml of a 0.05 M cobalt ammine complex compound solution at a flow rate of 500 ml/min. to contact the complex compound solution with the gas, and a percent $NO_x$ removal was determined at the same time. At that time absorption temperature of nitrogen monoxide was the dew point temperature of the ordinary combustion flue gas, that is, 55° C.

When the flue gas contained 3 % of oxygen, a percent $NO_x$ removal of above 90 % was obtained, but when the flue gas contained no oxygen, the percent $NO_x$ removal was considerably lowered. This shows that the oxygen existing in the flue gas is formed into oxygen complexes, and the oxygen complexes thus formed oxidizes and absorbs nitrogen monoxide, supporting the afore-mentioned results.

In that case, color of the cobalt ammine complex compound solution changed from yellowish brown to pink by passing the oxygen through the solution, and further changed to reddish brown by passing nitrogen monoxide through the solution. The color change of the solution also shows that the oxygen undergoes coordination into complex compounds, and further that the nitrogen monoxide is oxidized and absorbed as nitrous acid.

Among the metallic ions capable of forming oxygen complexes, ammine complexes individually of copper and chromium ions were prepared, and percent $NO_x$ removals of the individual complexes were determined under the same conditions as above. The results show that these complexes can remove $NO_x$, though the percent $NO_x$ removals are as low as 30 to 40 %, as compared with the cobalt complex. This shows that the oxygen complexes are effective for removing $NO_x$ from a flue gas.

An ability of the transition metal complex to absorb nitrogen monoxide also greatly depends upon kinds of ligand that undergoes coordination with the transition metal. Thus, the present inventors also studied histidine (alanylimidazole), a derivative of imidazole,

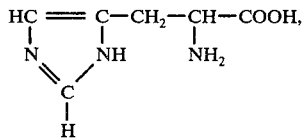

and ethanolamine, one of amines, $NH_2CH_2CH_2OH$, as the ligand, besides ammonia. That is, an artificial flue gas containing 300 ppm of nitrogen monoxide, and 3 % of oxygen, the balance being nitrogen was passed through 100 ml of a 0.05 M solution of cobalt histidine complex compound, $[Co(His)_2]^{2+}$, where "His" is an abbreviation of histidine, at a rate of 500 ml/min., and percent $NO_x$ removal was determined at a temperature of 55° C. It was found that the percent $NO_x$ removal was 90 %, and the imidazole derivative as the ligand was effective. When a similar test was carried out with a 0.5 M solution of cobalt ethanol amine complex compound, $[Co(NH_2CH_2CH_2OH)]^{2+}$, it was found that the percent NOx removal was 95 %, and the amine as the ligand was effective.

Now, the present invention will be described below in detail, referring to Examples.

EXAMPLE 1

Ammonia water was added to an aqueous solution of divalent cobalt chloride, $CoCl_2$, to form cobalt ammine complex compounds. The resulting solution had a higher pH as such, and thus was admixed with hydrochloric acid to adjust pH to 8 and prepare a 0.05 M solution of cobalt ammine complex compound solution. An artificial flue gas containing no oxygen (nitrogen monoxide: 300 ppm, the balance: nitrogen) was passed through 100 ml of the complex compound solution at a flow rate of 500 ml/min., while keeping an absorption temperature at 55° C, flue gas dew point temperature. It was found that a percent $NO_x$ removal was as low as 5 %. It seems that the slight $NO_x$ removal in that case is due to formation of some oxygen complex due to absorption of oxygen from air when the complex compound solution was prepared.

EXAMPLE 2

Air was passed through the same complex compound solution as used in Example 1 to form oxygen complexes before the absorption of nitrogen monoxide was carried out. Then, the absorption test was carried out under the same conditions as in Example 1, and it was found that a percent $NO_x$ removal was 95%. It is seen that nitrogen monoxide was oxidized by the oxygen complexes and absorbed as nitrous acid.

EXAMPLE 3

An artificial flue gas containing oxygen (nitrogen monoxide: 300 ppm, oxygen 3 %, nitrogen: balance) was passed through 100 ml of a cobalt ammine complex compound solution having the same composition as in Example 1 at a flow rate of 500 ml/min., and it was found that a percent $NO_x$ removal was 95 %. It is seen that nitrogen monoxide was oxidized by the oxygen contained in the flue gas, and absorbed.

EXAMPLE 4

Histidine was added to an aqueous solution of divalent cobalt chloride in a molar ratio of 1 : 2, and the pH was adjusted to 6 to prepare a 0.05 M solution of cobalt histidine complex compound. When the same artificial flue gas containing oxygen as in Example 3 was passed through the solution under the same conditions as in Example 3, it was found that a percent $NO_x$ removal was 90 %. It is seen that nitrogen monoxide was oxidized by the oxygen contained in the flue gas, and absorbed, as in the case with the ammine complex compound.

EXAMPLE 5

Ethanolamine was added to an aqueous solution of divalent cobalt chloride to prepare a 0.05 M solution of cobalt ethanolamine complex compound solution. pH of the solution was 10, and an absorption test of nitrogen monoxide was carried out under the same conditions as in Example 3. It was found that a percent $NO_x$ removal was 95 %.

EXAMPLE 6

Figure 2:
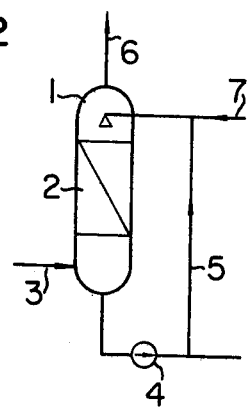
FIG. 2 is a schematic flow sheet of the present invention as applied to an industrial scale apparatus.

An embodiment of the present invention as applied to an industrial scale apparatus is shown in FIG. 2. A combustion flue gas 3 containing nitrogen oxides is led to an absorption column 1, where the flue gas 3 contacts an absorbing solution 5 through a gas-liquid contacting section 2 counter-currentwise, and the nitrogen oxides are removed thereby. The flue gas is discharged from the column as a purified gas 6. The absorbing solution 5 is withdrawn from the bottom of the absorbing column 1 by a circulating pump 4, and recycled to the upper part of the absorbing column, then to the gas-liquid contacting section and the bottom of the absorbing column in this order. The percent $NO_x$ removal at the absorbing column can be kept constant by withdrawing a portion of the absorbing solution 5 and making up with the corresponding amount of fresh solution 7.

What is claimed is:

1. A method for removing nitrogen oxides comprising nitrogen monoxide from a flue gas by absorption, which comprises contacting in the presence of oxygen a flue gas containing nitrogen oxides comprising nitrogen monoxide with an aqueous solution comprising a transition metal complex compound of a transition metal and a ligand, wherein said transition metal complex compound forms a complex with oxygen, where said transition metal is selected from the group consisting of divalent cobalt and divalent chromium and where a ligand of said transition metal complex compound is selected from the group consisting of ammonia, an amine, and an imidazole derivative retaining the imidazole moiety whereby nitrogen monoxide is oxidized and absorbed as nitrous acid in said aqueous solution.

2. A method for removing nitrogen oxides comprising nitrogen monoxide from a flue gas by absorption, which comprises contacting a flue gas containing oxygen and nitrogen oxides comprising nitrogen monoxide with an aqueous solution of a transition metal complex compound of a transition metal and a ligand, wherein said transition metal complex compound forms a complex with oxygen, where said transition metal is selected from the group consisting of divalent cobalt and divalent chromium and where a ligand of said transition metal complex compound is selected from the group consisting of ammonia, an amine, and an imidazole derivative retaining the imidazole moiety whereby nitrogen monoxide is oxidized and absorbed as nitrous acid in said aqueous solution.

3. A method according to claim 1, wherein said ligand is ethanolamine.

4. A method according to claim 1, wherein said ligand is histidine.

5. A method according to claim 1, wherein, said oxygen is 0.1 to 20 % by volume on the basis of total volume of the flue gas.

6. A method according to claim 1, wherein said transition metal is divalent cobalt.

7. A method according to claim 1 wherein said ligand is ammonia.

8. A method according to claim 2, wherein said oxygen is 0.1 to 20% by volume on the basis of total volume of the flue gas.

9. A method according to claim 2, wherein said aqueous solution is a 0.05 M to 0.5 M solution of said transition metal complex compound.

10. A method according to claim 2, wherein said flue gas is washed countercurrently with said aqueous solution.

11. A method for removing nitrogen oxides comprising nitrogen monoxide from a flue gas by absorption, which comprises contacting a flue gas containing oxygen and nitrogen oxides comprising nitrogen monoxide with an aqueous solution of a transition metal complex compound of a transition metal and a ligand, wherein said transition metal complex compound forms a complex with oxygen, where said transition metal is divalent cobalt and where said ligand is selected from the group consisting of ammonia, an amine, and an imidazole derivative retaining the imidazole moiety, whereby nitrogen monoxide is oxidized and absorbed as nitrous acid in said aqueous solution.

12. A method according to claim 11, wherein said ligand is ethanolamine.

13. A method according to claim 11, wherein said ligand is histidine.

14. A method according to claim 11, wherein said ligand is ammonia.

15. A method according to claim 11, wherein said oxygen is 0.1 to 20% by volume on the basis of total volume of the flue gas.

16. A method according to claim 11, wherein said aqueous solution is a 0.05 M to 0.5 M solution of said transition metal complex compound.

17. A method according to claim 11, wherein said flue gas is washed countercurrently with said aqueous solution.

* * * * *